(12) United States Patent
Sgro et al.

(10) Patent No.: US 8,898,593 B2
(45) Date of Patent: Nov. 25, 2014

(54) IDENTIFICATION OF SHARING LEVEL

(75) Inventors: Richard Joseph Sgro, Boston, MA (US); Manoj Sharma, Wellesley, MA (US); Yong Woo Rhee, Seattle, WA (US); Bojana Marjanovic Duke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 58 days.

(21) Appl. No.: 13/253,074

(22) Filed: Oct. 5, 2011

(65) Prior Publication Data
US 2013/0091461 A1    Apr. 11, 2013

(51) Int. Cl.
G06F 3/048    (2013.01)
G06F 17/30    (2006.01)

(52) U.S. Cl.
CPC .......... G06F 3/048 (2013.01); G06F 17/30011 (2013.01)
USPC ............................ 715/810; 715/751; 715/769

(58) Field of Classification Search
CPC ........................... G06F 17/30011; G06F 3/048
USPC .......................................... 715/751, 769, 810
See application file for complete search history.

(56) References Cited

U.S. PATENT DOCUMENTS

| | | | |
|---|---|---|---|
| 5,008,853 A * | 4/1991 | Bly et al. | 715/751 |
| 5,220,657 A * | 6/1993 | Bly et al. | 711/152 |
| 6,185,563 B1 * | 2/2001 | Hino | 1/1 |
| 7,530,022 B2 | 5/2009 | Ben-Shachar et al. | |
| 7,567,987 B2 | 7/2009 | Shappell et al. | |
| 7,698,660 B2 | 4/2010 | Sanchez et al. | |
| 7,730,543 B1 | 6/2010 | Nath | |
| 2004/0153456 A1 * | 8/2004 | Charnock et al. | 707/10 |
| 2004/0193621 A1 | 9/2004 | Moore et al. | |

(Continued)

FOREIGN PATENT DOCUMENTS

| | | |
|---|---|---|
| EP | 1311973 B1 | 5/2003 |
| KR | 1020010096933 A | 11/2001 |
| KR | 1020070012569 A | 1/2007 |

OTHER PUBLICATIONS

"FreeAgent Dockstar—Sharing Files and Folders [214931]", Retrieved at <<http://seagate.custkb.com/seagate/crm/selfservice/search.jsp?DocId=214931&NewLang=en>>, Retrieved Date: Jul. 11, 2011, pp. 3.

(Continued)

*Primary Examiner* — Stephen Hong
*Assistant Examiner* — Marshon Robinson
(74) *Attorney, Agent, or Firm* — Tom Wong; Jim Ross; Micky Minhas

(57) ABSTRACT

Technologies are described herein for identifying a sharing level of content items in a content library. The content library includes a first content item having a first sharing configuration and a second content item having a second sharing configuration. The first sharing state associated with the first content item is set based on the first sharing configuration. The second sharing state associated with the second content item is set based on the second sharing configuration. A content list including multiple rows and a sharing hint column is displayed. A first row corresponds to the first content item, and a second row corresponds to the second content item. A first icon corresponding to the first sharing state is arranged under the sharing hint column on the first row. A second sharing icon corresponding to the second sharing state is arranged under the sharing hint column on the second row.

20 Claims, 5 Drawing Sheets

(56) References Cited

U.S. PATENT DOCUMENTS

| | | | |
|---|---|---|---|
| 2005/0097441 A1* | 5/2005 | Herbach et al. | 715/501.1 |
| 2006/0224605 A1* | 10/2006 | Marcy et al. | 707/100 |
| 2007/0118802 A1* | 5/2007 | Gerace et al. | 715/738 |
| 2007/0198605 A1* | 8/2007 | Saika | 707/202 |
| 2008/0086534 A1* | 4/2008 | Bardak et al. | 709/206 |
| 2008/0114844 A1* | 5/2008 | Sanchez et al. | 709/206 |
| 2009/0249244 A1* | 10/2009 | Robinson et al. | 715/781 |
| 2010/0070899 A1* | 3/2010 | Hunt et al. | 715/769 |
| 2010/0122174 A1* | 5/2010 | Snibbe et al. | 715/733 |
| 2010/0241971 A1* | 9/2010 | Zuber | 715/753 |
| 2010/0332998 A1* | 12/2010 | Sun et al. | 715/757 |
| 2011/0213806 A1* | 9/2011 | Zuber | 707/784 |
| 2012/0054636 A1* | 3/2012 | Robertson-Hodder | 715/748 |
| 2012/0060082 A1* | 3/2012 | Edala et al. | 715/231 |
| 2012/0072854 A1* | 3/2012 | Zhou | 715/751 |
| 2012/0158494 A1* | 6/2012 | Reis et al. | 705/14.49 |
| 2012/0163574 A1* | 6/2012 | Gundotra et al. | 379/114.03 |
| 2012/0166282 A1* | 6/2012 | Reis et al. | 705/14.55 |

OTHER PUBLICATIONS

"File Sharing Settings and Permissions", Retrieved at <<https://login.salesforce.com/help/docien/collab_files_settings_perms.htm>>, Retrieved Date: Jul. 11, 2011, pp. 2.

"Match Ware Shared Workspace", Retrieved at <<http://www.matchware.com/en/products/shared-workspace/default.htm, Retrieved Date: Jul. 11, 2011, pp. 3.

"Sharing Photo Albums", Retrieved at <<http://www.keepandshare.com/htm/help3/photo/sharing-albums.php>>, Retrieved Date: Jul. 12, 2011, pp. 3.

"International Search Report", Mailed Date: Feb. 26, 2013, Application No. PCT/US2012/058822, Filed Date: Oct. 5, 2012, pp. 17.

* cited by examiner

IDENTIFICATION OF SHARING LEVEL

BACKGROUND

An enterprise information system may provide functionality whereby each user within the enterprise can maintain a document library. Each document library may contain various files that an owner of the document library can share with other users within the enterprise and/or external to the enterprise. The owner may set permissions for each file in the owner's document library. The permissions for each file may specify the particular users within the enterprise and/or external to the enterprise who have access to the file.

When the owner manages a document library that contains a large number of files, the owner may have difficulty remembering the permissions for every file. Conventional enterprise information systems may have no easy way for the owner to quickly determine the particular users who have access to each file. Further, these conventional enterprise information systems may not provide an intuitive interface through which the owner can easily modify the permissions for each file.

It is with respect to these considerations and others that the disclosure made herein is presented.

SUMMARY

Technologies are described herein for providing an iconographic sharing hint in a content list of a user interface. The content list may display a list of content items and relevant information associated with the content list. The relevant information may include a sharing hint column. Multiple sharing icons may be arranged under the sharing hint column. Each sharing icon may identify a sharing state corresponding to one of the content items. By viewing the sharing icons in the content list, an owner of the content items can quickly and easily identify the sharing state of any given content item.

In some example technologies, a method is configured to identify a sharing level of content items in a content library. According to the method, technologies may retrieve a first sharing configuration associated with a first content item in the content library and retrieve a second sharing configuration associated with a second content item in the content library. The technologies may also set a first sharing state associated with the first content item based on the first sharing configuration and set a second sharing state associated with the second content item based on the second sharing configuration.

The technologies may further display a content list containing a plurality of rows, a plurality of columns, and a plurality of elements. The plurality of rows may include a first row corresponding to the first content item and a second row corresponding to the second content item. The plurality of columns may include a sharing hint column. The plurality of elements may include a first element and a second element. The first element may be arranged under the sharing hint column on the first row and contain a first sharing icon corresponding to the first sharing state. The second element may be arranged under the sharing hint column on the second row and contain a second sharing icon corresponding to the second sharing state.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
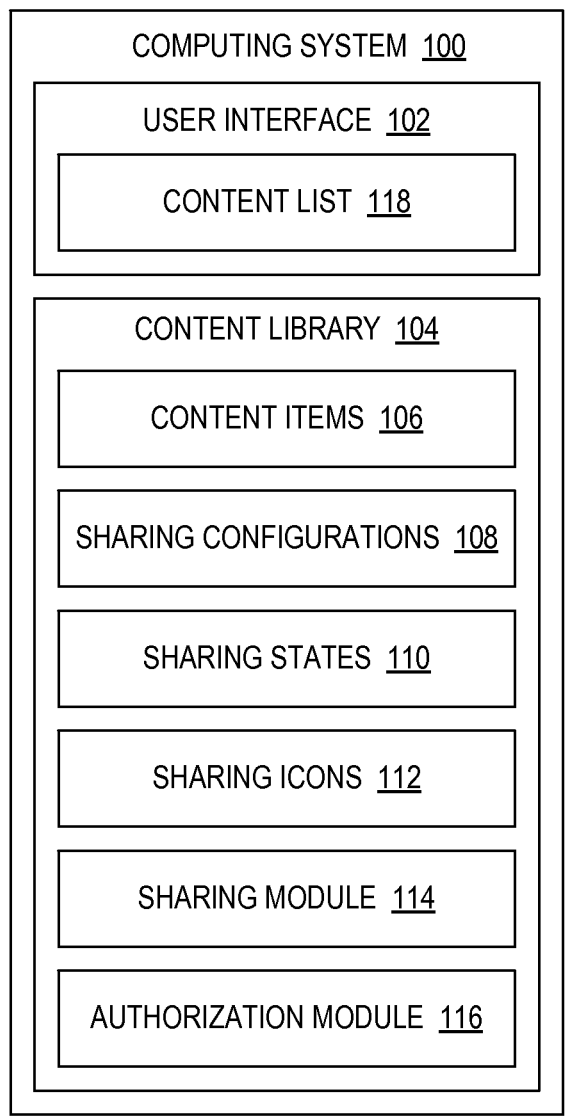
FIG. 1 is a block diagram illustrating a computing system adapted to provide a sharing hint, in accordance with some embodiments.

The following detailed description is directed to technologies for providing an iconographic sharing hint in a content list of a user interface. The content list may include a listing of content items stored in a content library. The user interface may be configured to provide an owner of the content items with access to a listing of the content items contained in the content library. The content library may contain files, websites, and/or other shareable content items that are controlled by the owner. The user interface may provide various views of the content library. Some of these views may include a listing (also referred to herein as a content list) of at least some of the content items contained in the content library.

The content list may display an ordered or unordered list of the content items and relevant information associated with each of the content items. The content list may be arranged in a table, grid, or other suitable data structure containing multiple rows, multiple columns, and multiple elements. Each row may correspond to a particular content item and each column may correspond to a category of information associated with the particular content item. Each element may correspond to one of the rows and one of the columns. In particular, each element may provide information corresponding to one category and corresponding to one content item. Some example columns may include a type column indicating a type of the content item, a name column indicating a name of the content item, a last modified column indicating a date and time that the content item was last modified by a user, and a modified by column identifying the user who last modified the content item.

According to various embodiments, the content list may also include a sharing hint column indicating a sharing state of each content item. The user interface may provide the sharing hint column as a default column in some configurations of the content list. The user interface may also provide functionality whereby the owner can customize some other configurations of the content list by adding and/or removing the sharing hint column. The sharing state may be represented by a particular sharing icon. Multiple sharing icons may be arranged under the sharing hint column, where each sharing icon corresponds to a particular content item.

Some example implementations of the sharing icon may include a lock icon, a person icon, a people icon, a building icon, and a globe icon. Other icons may be similarly utilized according to other implementations. The lock icon may convey that the content item is not shared by the owner and is accessible only by the owner. The person icon may convey that the content item is shared by the owner with a number of users less than or equal to a threshold value. The people icon may convey that the content item is shared by a number of users greater than the threshold value. The building icon may convey that the content item is shared with every employee within an enterprise. The globe icon may convey that the content item is shared publicly with everyone.

One or more of the sharing icons may include a numeric indicator positioned adjacent to or partially overlapping the sharing icons. The numeric indicator may specify the number (i.e., quantity) of users who are authorized access to a particular content item. The owner may perform a user interaction on one of the sharing icons to retrieve additional information. In one example, the owner may hover a cursor over a sharing icon to access a tooltip corresponding to an associated content item. In another example, the owner may select a sharing icon to access a window that allows the owner to contact users who are authorized to access the associated content item.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing an iconographic sharing hint in a content list of a user interface is presented. FIG. 1 is a block diagram illustrating a computing system 100 adapted to provide a sharing hint, in accordance with some embodiments. The computing system 100 may include a user interface 102 and a content library 104. The content library 104 may include content items 106, sharing configurations 108, sharing states 110, sharing icons 112, a sharing module 114, and an authorization module 116. Each of the content items 106 may correspond to one of the sharing configurations 108 and one of the sharing states 110. Each of the sharing states 110 may correspond to one of the sharing icons 112.

In an illustrative implementation, the computing system 100 may be a server computer adapted to provide collaboration services within an enterprise. Example collaboration services may include the ability to create and/or share the content items 106 between users within the enterprise and external to the enterprise. As used herein, an enterprise may refer to a company, a corporation, an organization, or other suitable business entity. Also as used herein, users may refer to employees within the enterprise as well as non-employees external to the enterprise.

The content items 106 may refer to any suitable content that is accessible via a hyperlink. In some embodiments, the content items 106 may include files. Some examples of files may include documents, such as word processing documents, spreadsheet documents, or presentation documents. In some other embodiments, the content items 106 may include websites. The content library 104 may refer to a shared storage location adapted to store the content items 106. The content library 104 may be remotely accessible via a private network, such as an intranet within the enterprise, or public network, such as the Internet.

The content items 106 may be created by an owner within an enterprise. When the owner creates a given content item, the owner may set one of the sharing configurations 108 associated with the content item. The sharing configuration may specify to whom the content item is shared. In one example, the owner may set the sharing configuration as private, whereby the content item not shared. In another example, the owner may set the sharing configuration as semi-private, whereby the content item is accessible by one or more users. The owner may authorize these users individually and/or by group (e.g., a department, a project group, etc.). In yet another example, the owner may set the sharing configuration as public, whereby the content item is publicly accessible by everyone. Users who have been authorized by the owner to access the content item may also be referred to as authorized users.

The sharing configuration may also specify a sharing level at which a content item is shared. The sharing level may indicate an authorized user's level of access with the content item. For example, one sharing level may permit the authorized user to view and edit the content item, while another sharing level may permit the authorized user to view the content item but not to edit the content item.

According to some embodiments, each of the content items 106 may be associated with a hyperlink. A user may access a given content item from the content library 104 via the associated hyperlink. When the user attempts to access a content item that is public, the user may freely access the content item without further verification. When the user attempts to access a content item that is not public, the authorization module 116 may request that the user enter authorization information (e.g., a username and password). The authorization module 116 may verify the authorization information submitted by the user. If the user has been authorized by the owner to access the content item according to the configuration information associated with the content item, then the authorization module 116 may grant authorization to the user to access the content item.

According to various embodiments, the sharing module 114 may be configured to set one of the sharing states 110 associated with each of the content items 106. The sharing state may be set to a locked state, a small semi-locked state, a large semi-locked state, an enterprise state, or a global state, in an illustrative implementation. Other sharing states may be similarly utilized according to other implementations. When the sharing configuration of the content item is set as private, then the sharing module 114 may set the corresponding sharing state to the locked state. The locked state may indicate that the content item is accessible only by the owner according to the associated sharing configuration. The authorization module 116 may grant authorization to only the owner to access the content item.

When the sharing configuration of the content item is set as semi-private, then the sharing module 114 may set the corresponding sharing state to the small semi-locked state, the large semi-locked state, or the enterprise state. The sharing module 114 may set the sharing state to the small semi-locked state if the number of users authorized to access the content item according to the associated sharing configuration is less than or equal to a threshold value (e.g., ten users). The sharing module 114 may set the sharing state to the large semi-locked state if the number of users authorized to access the content item according to the associated sharing configuration is greater than the threshold value. The small semi-locked state and the large semi-locked state may indicate that the content item is accessible only by authorized users. The authorization module 116 may grant authorization to only the owner and the authorized users to access the content item.

The sharing module 114 may set the sharing state to the enterprise state if every employee in the enterprise is authorized to access the content item according to the associated sharing configuration. The enterprise state may indicate that the content item is accessible only by employees within the enterprise. The authorization module 116 may grant authorization to only the owner and the employees to access the content item.

The sharing module 114 may set the sharing state to the global state if everyone is authorized to access the content item according to the associated sharing configuration. The global state may indicate that the content is accessible by everyone. The authorization module 116 may grant authorization to any requesting user to access the content item and not request authorization information from the users.

Figure 2:
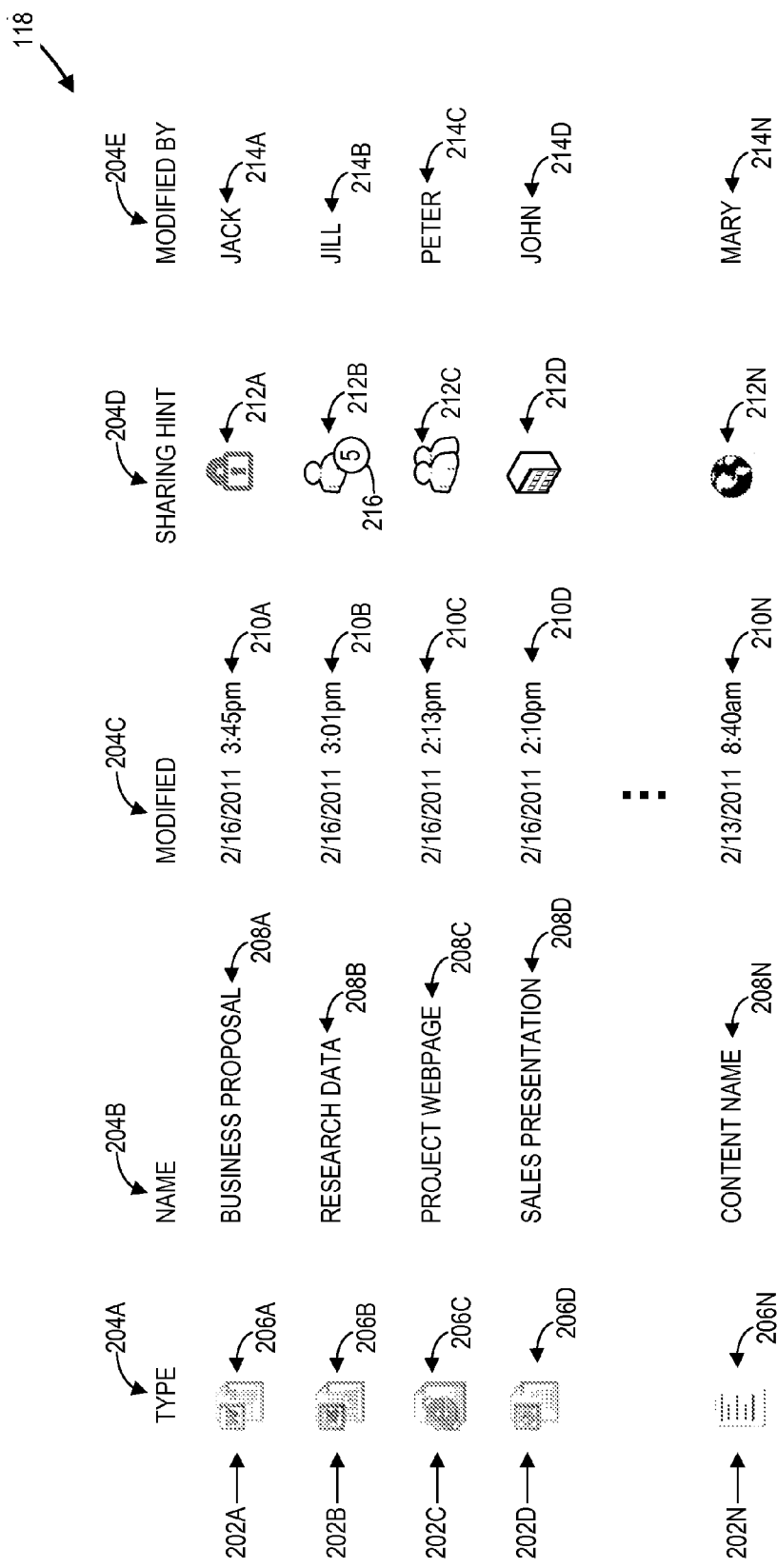
FIG. 2 is a diagram illustrating an example implementation of the content list, in accordance with some embodiments.

The locked state, the small semi-private state, the large semi-private state, the enterprise state, and the global state may each be associated with one of the sharing icons 112. In an example implementation, the sharing icons 112 may include a lock icon, a person icon, a people icon, a building icon, and a globe icon. In this implementation, the lock icon may be associated with the locked state and indicate that the content item is accessible only by the owner. The person icon may be associated with the small semi-private state and indicate that the number of users authorized to access the content item is less than or equal to a threshold value. The people icon may be associated with the large semi-private state and indicate that the number of users authorized to access the content item is greater than the threshold value. The building icon may be associated with the enterprise state and indicate that every employee in the enterprise is authorized to access the content item. The globe icon may be associated with the global state and indicate that everyone is authorized to access the content item. Illustrative examples of the lock icon, the person icon, the people icon, the building icon, and the globe icon are illustrated in FIG. 2, which is described in greater detail below. Other sharing icons may be similarly utilized according to other implementations.

The user interface 102 may be configured to display a content list 118. The content list 118 may contain a list of at least a portion of the content items 106 contained in the content library 104. For example, the list may contain names of the content items 106. The owner may access the user interface 102 to view the content list 118. According to some embodiments, the content list 118 may be arranged as a table, grid, or other suitable data structure that includes multiple rows, multiple columns, and multiple elements. Each element may correspond to one of the rows and one of the columns.

Each row may correspond to one of the content items 106. Each column may correspond to content information associated with the content items 106. The user interface 102 may be configured in one of multiple predefined arrangements. Each predefined arrangement may include certain columns by default. The user interface 102 may also provide functionality whereby the owner can generate a custom arrangement by adding and/or deleting columns.

Some example columns may include a name column, a modified column, a modified by column, and a type column. The name column may display names of the content items 106. Each element under the name column may display a name of one of the content items 106. The modified column may display dates and times in which the content items 106 were last modified. Each element under the modified column may display a date and time for one of the content items 106. The modified by column may display user identifiers that identify users who modified the content items 106 at the date and times specified in the modified column. Each element under the modified by column may display a user identifier for one of the content items 106.

The type column may specify types of the content items 106. Whereas the name column, the modified column, and the modified by column may display the corresponding content information in alphanumeric format, the type column may display the types in iconographic format. For example, separate icons may distinguish between a word processing document, a spreadsheet document, and a presentation document. Each element under the type column may display a type for one of the content items 106.

In addition to the name column, the modified column, the modified by column, and the type column, the user interface 102 may also include a sharing hint column. According to various embodiments, the sharing hint column may display one of the sharing icons 112 for each of the content items 106 corresponding to the rows. In particular, the sharing hint column may display the particular sharing icon (e.g., the lock icon, the person icon, the people icon, the building icon, or the globe icon) corresponding to the sharing state (e.g., the locked state, the small semi-private state, the large semi-private state, the enterprise state, the global state) for each of the content items 106.

One or more of the sharing icons 112 may include dynamic information that is arranged adjacent to or to partially overlap each of the sharing icons 112. As previously described, the person icon may correspond to the small semi-private state and indicate that the number of users authorized to access the content item is less than or equal to a threshold value. In an illustrative example, the person icon may also include a numeric indicator that specifies the actual number (i.e., quantity) of authorized users and is arranged adjacent to or to partially overlap the person icon. This numeric indicator may or may not be included in the people icon or other icons. In another illustrative example, the sharing icons 112 may glow or show some other visual highlight to convey further information. The glow may indicate that one of the authorized users is currently editing the content item, thereby possibly making the content item temporarily inaccessible while the authorized user edits the content item. An illustrative example of the content list 118 is illustrated in FIG. 2, which is described in greater detail below.

Each of the sharing icons 112 may be activated by hovering a cursor over one of the sharing icons 112 and/or by selecting one of the sharing icons 112 via a suitable input device. When a user hovers a cursor over a sharing icon associated with a particular content item, the user interface 102 may launch a tooltip associated with the content item. The tooltip may be a message that appears when the cursor is positioned over the sharing icon and disappears when the cursor is positioned away from the sharing icon. In some embodiments, the message may include a description of the sharing icon. For example, a tooltip corresponding to the building icon may contain a textual description stating that the content item is shared by everyone within the enterprise. In some other embodiments, the message may include a list of users who are authorized to access the content item. It should be appreciated that such a list may be available where the number of authorized users is less than or equal to the threshold value (e.g., in the small semi-locked state) and not available where the number of authorized users is greater than the threshold value (e.g., in the large semi-locked state).

When the user selects one of the sharing icons 112 (e.g., via a mouse click Or a touch input), the user interface 102 may launch a window that includes a list of employees authorized to access the content item. The list of employees may also be interactive. Some implementations of the window may allow a user to contact a single employee or a group of employees via email, instant message, text message, or other communication method. For example, when the user selects a name of an employee, the user interface 102 may launch an email application (not shown) and populate the recipient field of a blank email with an email address of the employee. Some other implementations of the window may allow a user to modify the associated sharing configuration for the content item. For example, the message may contain an interface whereby the user can add employees and/or delete employees who are authorized to access the content item. The message may also contain an interface whereby the user can change the level of authorization given to each authorized employee can view and edit, can view but cannot edit, etc.). An illustrative example of such a window is illustrated in FIG. 3, which is described in greater detail below.

FIG. 2 is a diagram illustrating an example implementation of the content list 118, in accordance with some embodiments. The content list 118 may include a first row 202A, a second row 202B, a third row 202C, a fourth row 202D, and an Nth row 202N. The rows 202A-202N may be collectively referred to as rows 202. The content list 118 may further include a type column 204A, a name column 204B, a modified column 204C, a sharing hint column 204D, and a modified by column 204E. The columns 204A 204E may be collectively referred to as columns 204.

A first type element 206A, a second type element 206B, a third type element 206C, a fourth type element 206D, and an Nth type element 206N may be arranged under the type column 204A. The type elements 206A-206N may be collectively referred to as type elements 206. The first type element 206A may be associated with a first content item and indicate that the first content item is a word processing document. The second type element 206B may be associated with a second content item and indicate that the second content item is a spreadsheet document. The third type element 206C may be associated with a third content item and indicate that the third content item is a webpage. The fourth type element 206D may be associated with a fourth content item and indicate that the fourth content item is a presentation document. The Nth type element 206N, which is a generic icon, may be associated with an Nth content item.

A first name element 208A, a second name element 208B, a third name element 208C, a fourth name element 208D, and an Nth name element 208N may be arranged tinder the name column 204B. The name elements 208A-208N may be collectively referred to as name elements 208. The first name element 208A may specify a name (e.g., "business proposal") that identifies the first content item. The second name element 208B may specify a name (e.g., "research data") that identifies the second content item. The third name element 208C may specify a name (e.g., "project webpage") that identifies the third content item. The fourth name element 208D may specify a name (e.g., "sales presentation") that identifies the fourth content item. The Nth name element 208N may specify a name (e.g., "content name") that identifies the Nth content item.

A first date and time element 210A, a second date and time element 210B, a third date and time element 210C, a fourth date and time element 210D, and an Nth date and time element 210N may be arranged under the modified column 204C. The date and time elements 210A-210N may be collectively referred to as date and time elements 210. The first date and time element 210A may specify the date and time that identifies when the first content item was last modified. The second date and time element 210B may specify the date and time that identifies when the second content item was last modified. The third date and time element 210C may specify the date and time that identities when the third content item was last modified. The fourth date and time element 210D may specify the date and time that identifies when the fourth content item was last modified. The Nth date and time element 210N may specify the date and time that identifies when the Nth content item was last modified.

As illustrated in FIG. 2, the content items listed in the content list 118 are arranged in reverse chronological order by the date and time in the date and time elements 210A-210N. The owner may modify the order of the content items based on various other configurations. In one example, the content items may be arranged in alphabetical order by the name in the name elements 208A-208N. In another example, the content items may be arranged according to groups of like sharing icons in the sharing hint column 204D.

A first sharing hint element 212A, a second sharing hint element 212B, a third sharing hint element 212C, a fourth sharing hint element 212D, and an Nth sharing hint element 212N may be arranged under the sharing hint column 204D. The sharing hint elements 212A-212N may be collectively referred to as sharing hint elements 212. The first sharing hint element 212A may include an example implementation of a lock icon, which indicates that the first content item is accessible only by the owner. The second sharing hint element 212B may include an example implementation of a person icon, which indicates that a number of users less than or equal to a threshold value are authorized to access the second content item. In some embodiments, the person icon in the second sharing hint element 212B may glow or show some other visual highlight. The glow may indicate that one of the authorized users is currently editing the second content item.

One or more of the sharing hint elements 212A-212N may include a numeric indicator that is arranged adjacent to or to partially overlap the person icon. The numeric indicator may specify the actual number of authorized users. For example, the person icon in the second sharing hint element 212B may include a numeric indicator 216. In the example illustrated in FIG. 2, the value of the numeric indicator 216 specifies that five users are currently authorized to access the second content item. If the owner adds additional authorized users, then the value of the numeric indicator 216 may increase. If the owner removes authorized users, then the value of the numeric indicator 216 may decrease.

The third sharing hint element 212C may include an example implementation of a people icon, which indicates that a number of users greater than the threshold value are authorized to access the third content item. The fourth sharing hint element 212D may include an example implementation of a building icon, which indicates that every employee in the enterprise is authorized to access the fourth content item. The Nth sharing hint element 212N may include an example implementation of a globe icon, which indicates that everyone is authorized to access the Nth content item.

A first user element 214A, a second user element 214B, a third user element 214C, a fourth user element 214D, and an Nth user element 214N may be arranged under the modified by column 204E. The user elements 214A-214N may be collectively referred to as user elements 214. The first user element 214A may identify the user who last modified the first content item. The second user element 214B may identify the user who last modified the second content item. The third user element 214C may identify the user who last modified the third content item. The fourth user element 214D may identify the user who last modified the fourth content item. The Nth user element 214N may identify the user who last modified the Nth content item. The users may be identified by name, email address, and/or other suitable identifier.

Figure 3A:
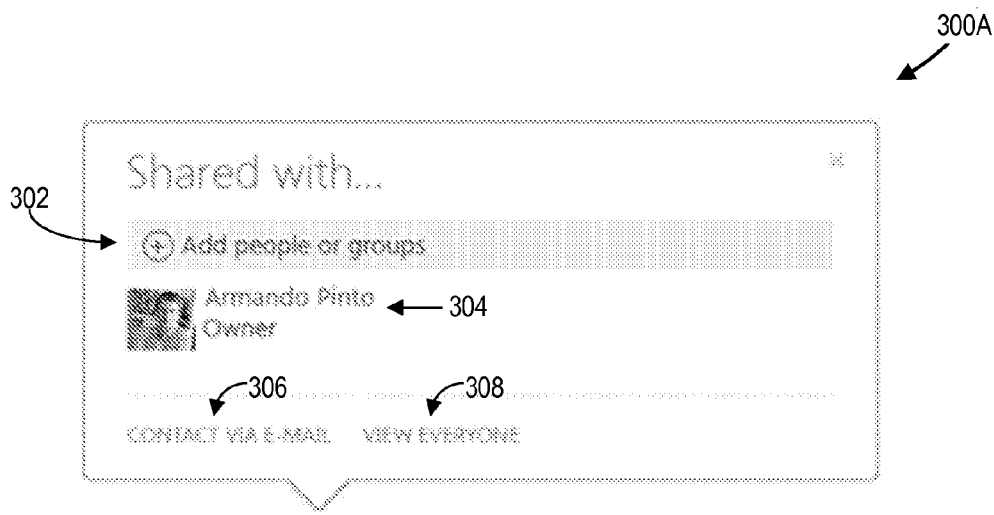
FIGS. 3A and 3B are example screen diagrams illustrating windows launched by the user interface when an owner selects one of the sharing icons under the sharing hint column, in accordance with some embodiments
Figure 3B:
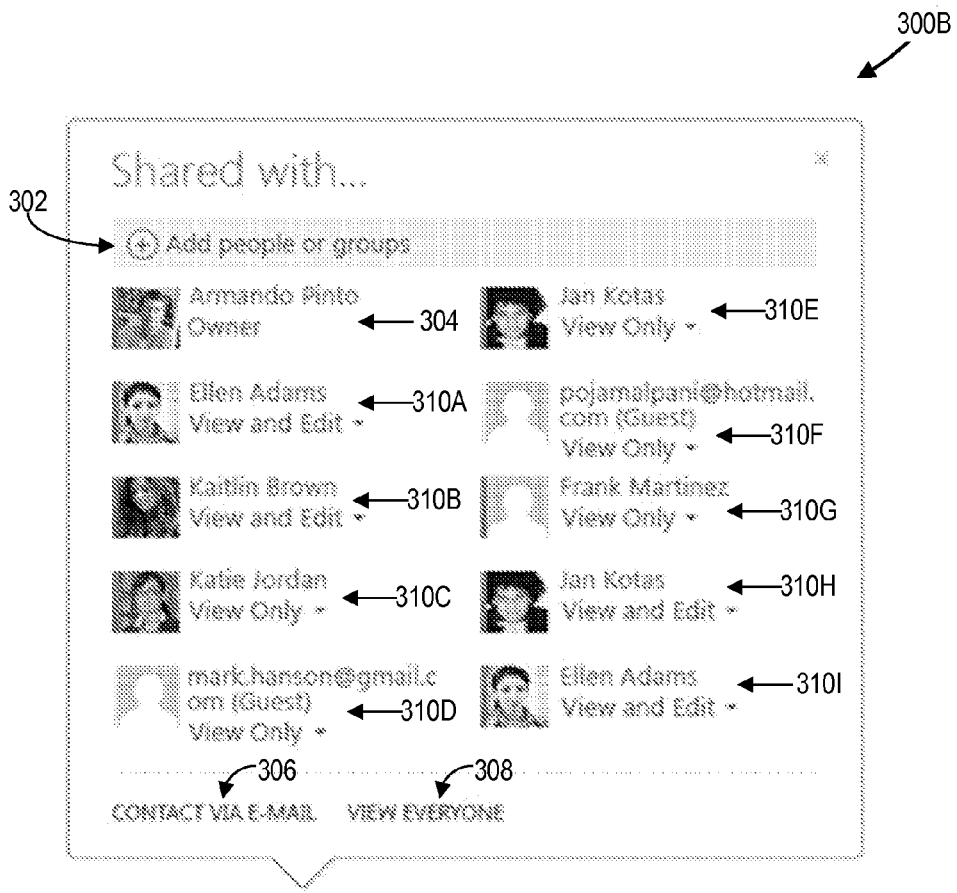

FIGS. 3A and 3B are example screen diagrams illustrating windows 300A, 300B launched by the user interface 102 when an owner selects one of the sharing icons 112 under the sharing hint column 204D, in accordance with some embodiments. In FIG. 3A, the window 300A includes an add option 302, owner information 304, a contact everyone option 306, and a view everyone option 308. The owner information 304 indicates that Armando Pinto is the name of owner. In this example, the content item associated with the window 300A is currently in the locked state. Here, the owner may select the add option 302 to add additional users who are authorized to access the content item. The owner may also delete users and/or modify the level of authorization with respect to particular users through the add option 302, according to some other implementations. The view everyone option 308 may be selectable when additional users can be shown and non-selectable when no additional users are authorized to access the content item.

In FIG. 3B, the window 300B includes the add option 302, the owner information 304, the contact everyone option 306, the view everyone option 308, and user information 310A-310I. The user information 310A-310I may be collectively referred to as user information 310. In this case, the owner may have selected the add option 302 to add additional users corresponding to the user information 310. The user information 310 may include the names of the users and the email addresses of the users. The owner may select one of names in the user information 310 to contact the corresponding authorized user. For example, the owner may select the name listed in the user information 310A to contact the user named Ellen Adams. If the owner wants to contact every authorized user, the owner may select the contact everyone option 306. Through the contact everyone option 306, the owner can create a single message that is distributed to every user authorized to access the content item.

Figure 4:
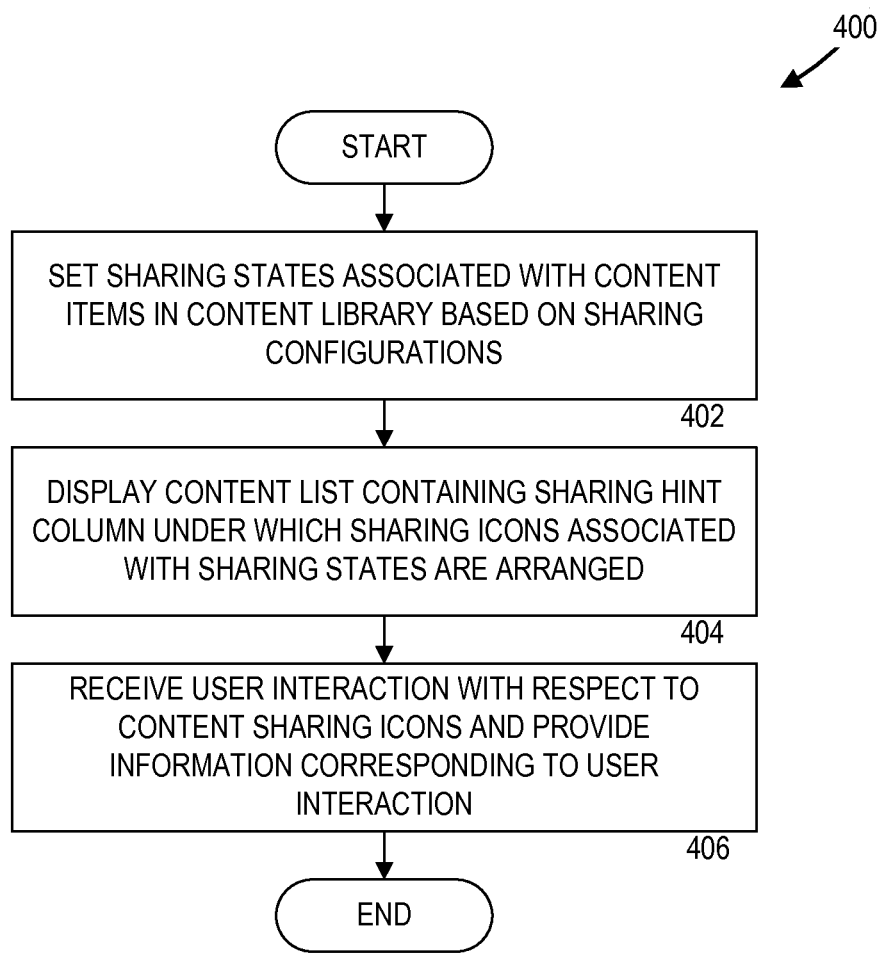
FIG. 4 is a flow diagram illustrating a method for identifying a sharing level, in accordance with some embodiments.

Referring now to FIG. 4, additional details regarding the operation of the user interface 102 and the sharing module 114 will be provided. FIG. 4 is a flow diagram illustrating a method for identifying a sharing level, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 4, a routine 400 begins at operation 402, where the sharing module 114 sets the sharing states 110 associated with the content items 106 based on the sharing configurations 108. Each of the content items 106 may be associated with one of the sharing configurations 108. Each of the sharing configurations 108 may define the users who are authorized to access the corresponding one of the content items 106. One of the sharing states 110 may correspond to each of the sharing configurations 108.

In some embodiments, the sharing states 110 may include a locked state, a small semi-locked state, a large semi-locked state, an enterprise state, or a global state. The locked state may indicate that the content item is accessible only by the owner. The small semi-locked state may indicate that the content item is accessible only by a number of users less than or equal to a threshold value. The large semi-locked state may indicate that the content item is accessible only by a number of users greater than the threshold value. The enterprise state may indicate that the content item is accessible only by employees within the enterprise. The global state may indicate that the content item is publicly accessible by everyone.

Each of the sharing states 110 may correspond to one of the sharing icons 112. In an illustrative implementation, the locked state may correspond to a first icon, such as the lock icon illustrated in the first sharing hint element 212A. The small semi-locked state may correspond to a second icon, such as the person icon illustrated in the second sharing hint element 212B. The large semi-locked state may correspond to a third icon, such as the people icon illustrated in the third sharing hint element 212C. The enterprise state may correspond to a fourth icon, such as the building icon illustrated in the fourth sharing hint element 212D. The global state may correspond to a fifth icon, such as the globe icon illustrated in the Nth sharing hint element 212N. When the sharing module 114 sets the sharing states 110 associated with the content items 106 based on the sharing configurations 108, routine 400 proceeds to operation 404.

At operation 404, the user interface 102 may display the content list 118. For example, the user interface 102 may display the content list 118 at the owner's request. The content list 118 may include multiple rows, multiple columns, and multiple elements. Some examples of the rows in the content list 118 may include the rows 202. Each row may correspond to a particular content item. Some examples of columns in the content list 118 may include the columns 204. The columns 204 may include the type column 204A, the name column 204B, the modified column 204C, and/or the modified by column 204E. Each element in the content list 118 may correspond to one of the rows and one of the columns.

In an illustrative example, the content list 118 may include five rows: a first row, a second row, a third, row, a fourth row, and a fifth row. Each of the five rows may correspond to a particular content item. That is, the first row may correspond to a first content item, the second row may correspond to a second content item, and so forth. Each element under the type column 204A may specify a type of the corresponding content item. Each element under the name column 204B may specify a name of the corresponding content item. Each element under the modified column 204C may specify a date and time when the corresponding content item was last modified. Each element under the modified by column 204E may specify the authorized user who last modified the corresponding content item.

The columns 204 in the content list 118 may also include the sharing hint column 204D. Each element under the sharing hint column 204D may contain the first sharing icon, the second sharing icon, the third sharing icon, the fourth sharing icon, or the filth sharing icon based on the sharing state associated with the corresponding content item. For example, if the first content item corresponds to the first sharing state, then the element corresponding to the first content item under the sharing hint column 204D may contain the first sharing icon. If the second content item corresponds to the fourth sharing state, then the element corresponding to the second content item under the sharing hint column 204D may contain the fourth sharing icon. When the user interface displays the content list 118, the routine 400 may proceed to operation 406.

At operation 406, the user interface 102 may receive a user interaction with respect to one of the sharing icons 112 under the sharing hint column 204D and provide information corresponding to the particular user interaction. The user interface 102 may be configured to accept a user interaction with respect to one or more of the sharing icons arranged under the sharing hint column 204D. The user interaction may include a user hovering a cursor over a sharing icon and/or selecting the sharing icon (e.g., via a mouse click).

When the user interaction involves the user hovering a cursor over a sharing icon, the user interface 102 may launch a tooltip associated with the content item corresponding to the sharing icon. The tooltip may be a message that appears when the cursor is positioned over the sharing icon and disappears when the cursor is positioned away from the sharing icon. In some embodiments, the message may include a description of the sharing icon. In some other embodiments, the message may include a list of employees authorized to access the content item. Some implementations of the message may allow a user to click on an employee to contact the employee via email, instant message, text message, or other communication method. Some other implementations may allow a user to modify the associated sharing configuration for the content item.

When the user interaction involves the user selecting the sharing icon, the user interface 102 may launch a window that includes a list of users authorized to access the content item. Some implementations of the window may allow a user to contact a single user or a group of users via email, instant message, text message, or other communication method. Some other implementations of the window may allow a user to modify the associated sharing configuration for the content item. When the user interface 102 receives a user interaction with respect to one of the sharing icons 112 under the sharing hint column 204D and displays information corresponding to the particular user interaction, the routine 400 may either repeat (e.g., periodically, continuously, or on demand as needed) or terminate.

Figure 5:
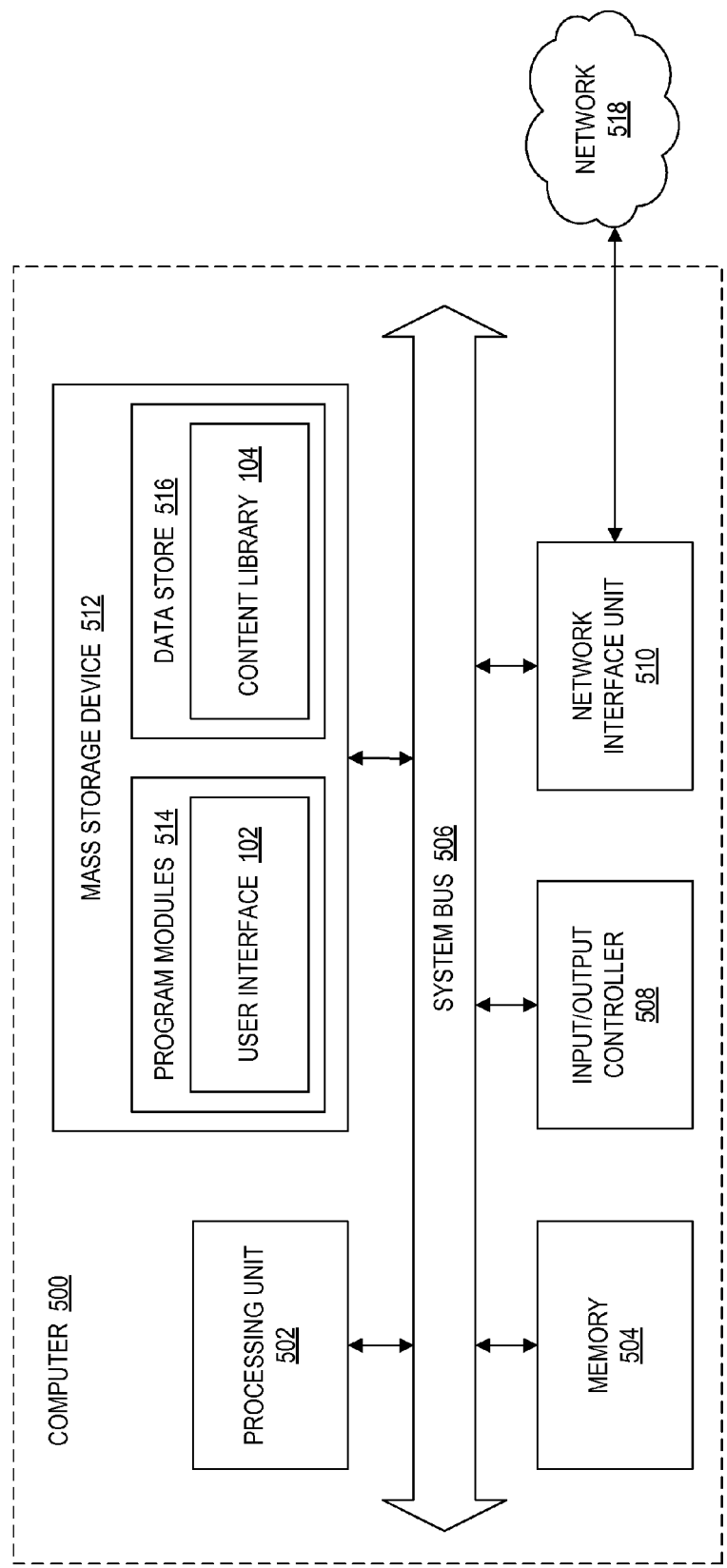
FIG. 5 is a computer architecture diagram showing an illustrative computer hardware architecture for a computing system capable of implementing the embodiments presented herein.

FIG. 5 is an example computer architecture diagram illustrating a computer 500. Examples of the computer 500 may include the computing system 100. The computer 500 may include a central processing unit 502, a system memory 504, and a system bus 506 that couples the memory 504 to the central processing unit 502. The computer 500 may further include a mass storage device 512 for storing one or more program modules 514 and a data store 516. Examples of the program modules 514 may include the user interface 102, the sharing module 114, and the authorization module 116. The data store 516 may store the content library 104, including the content items 106, the sharing configurations 108, the sharing states 110, and the sharing icons 112. The mass storage device 512 may be connected to the processing unit 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to provide an iconographic sharing hint in a content list of a user interface. The program modules 514 may also provide various tools or techniques by which the computer 500 may participate within the overall systems or operating environments using the components, flows, and data structures discussed throughout this description. For example, the program modules 514 may implement interfaces for providing an iconographic sharing hint in a content list of a user interface.

In general, the program modules 514 may, when loaded into the processing unit 502 and executed, transform the processing unit 502 and the overall computer 500 from a general-purpose computing system into a special-purpose computing system customized to provide an iconographic sharing hint in a content list of a user interface. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for providing an iconographic sharing hint in a content list of a user inter are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for identifying a sharing level of content items in a content library, the method comprising computer-implemented operations for:
    retrieving a first sharing configuration associated with a first content item in the content library;
    retrieving a second sharing configuration associated with a second content item in the content library;
    setting a first sharing state associated with the first content item based on the first sharing configuration, the first sharing state being set from a plurality of sharing states comprising a locked state indicating that a content item is accessible only by the owner, a small semi-locked state indicating that the content item is accessible only by a first number of users less than or equal to a threshold, a large semi-locked state indicating that the content item is accessible only by a second number of users greater than the threshold, an enterprise state indicating that the content item is accessible only by employees within an enterprise, and a global state indicating that the content item is publicly accessible;
    setting a second sharing state from the plurality of sharing states, the second sharing state associated with the second content item based on the second sharing configuration; and
    displaying a content list containing a plurality of rows, a plurality of columns, and a plurality of elements, the plurality of rows including a first row corresponding to the first content item and a second row corresponding to the second content item, the plurality of columns including a sharing hint column, the plurality of elements including a first element and a second element, the first element arranged under the sharing hint column on the first row and containing a first sharing icon corresponding to the first sharing state, the second element arranged under the sharing hint column on the second row and containing a second sharing icon corresponding to the second sharing state.

2. The computer-implemented method of claim 1, further comprising computer-implemented operations for:
    receiving a first user interaction indicating that a cursor is hovering over the first sharing icon; and
    in response to receiving the first user interaction indicating that the cursor is hovering over the first sharing icon, launching a tooltip positioned over the content list, the tooltip containing a list of names of authorized users who are authorized by an owner to access the first content item.

3. The computer-implemented method of claim 2, further comprising computer-implemented operations for:
    receiving a second user interaction indicating that the first sharing icon has been selected; and
    in response to receiving the second user interaction indicating that the first sharing icon has been selected, launching a window positioned over the content list, the window containing an interface enabling the owner to contact the authorized users.

4. The computer-implemented method of claim 3, wherein the interface further enables the owner to modify the authorized users.

5. The computer-implemented method of claim 1, wherein the first sharing configuration specifies a first set of users who are authorized by an owner to access the first content item; and wherein the second sharing configuration specifies a second set of users who are authorized by the owner to access the second content item.

6. The computer-implemented method of claim 5, wherein setting the first sharing state associated with the first content item based on the first sharing configuration comprises identifying, from the plurality of sharing states, the first sharing state that matches the first sharing configuration; and wherein setting the second sharing state associated with the second content item based on the second sharing configuration comprises identifying, from the plurality of sharing states, the second sharing state that matches the second sharing configuration.

7. The computer-implemented method of claim 5, wherein displaying the content list containing the plurality of rows, the plurality of columns, and the plurality of elements comprises:
identifying, from a plurality of sharing icons, the first sharing icon that matches the first sharing state; and
identifying, from the plurality of sharing icons, the second sharing icon that matches the second sharing state.

8. The computer-implemented method of claim 7, wherein the plurality of sharing icons comprises a lock icon corresponding to the locked state, a person icon corresponding to the small semi-locked state, a people icon corresponding to the large semi-locked state, a building icon corresponding to the enterprise state, and a globe icon corresponding to the global state.

9. The computer-implemented method of claim 8, wherein a quantity of the first set of users is less than the threshold; wherein the first sharing icon comprises the person icon; and wherein the first sharing icon comprises a numeric indicator arranged adjacent to or partially overlapping the first sharing icon, the numeric indicator specifying the quantity of the first set of users.

10. The computer-implemented method of claim 1, wherein the plurality of columns further comprises a type column, a name column, a modified column, and a modified by column;
wherein the plurality of elements further comprises a first type element, a second type element, a first name element, a second name element, a first modified element, a second modified element, a first modified by element, and a second modified by element;
wherein the first type element is arranged under the type column on the first row and contains a first type icon specifying a first type of the first content item, and the second type element is arranged under the type column on the second row and contains a second type icon specifying a second type of the second content item;
wherein the first name element is arranged under the name column on the first row and contains a first name of the first content item, and the second name element is arranged under the name column on the second row and contains a second name of the second content item;
wherein the first modified element is arranged under the modified column on the first row and contains a first date and time when the first content item was last modified, and the second modified element is arranged under the modified column on the second row and contains a second date and time when the second content item was last modified; and
wherein the first modified by element is arranged under the modified by column on the first row and contains a first identifier of who last modified the first content item, and the second modified by element is arranged under the modified by column on the second row and contains a second identifier of who last modified the second content item.

11. A computer-readable storage medium having computer-executable instructions stored thereon which, when executed by a computer, cause the computer to:
retrieve a first sharing configuration associated with a first content item in a content library, the first sharing configuration specifying a first set of users who are authorized by an owner to access the first content item;
retrieve a second sharing configuration associated with a second content item in the content library, the second sharing configuration specifying a second set of users who are authorized by the owner to access the second content item;
set a first sharing state associated with the first content item based on the first sharing configuration, the first sharing state being set from a plurality of sharing states comprising a locked state indicating that a content item is accessible only by the owner, a small semi-locked state indicating that the content item is accessible only by a first number of users less than or equal to a threshold, a large semi-locked state indicating that the content item is accessible only by a second number of users greater than threshold, an enterprise state indicating that the content item is accessible only by employees within an enterprise, and a global state indicating that the content item is publicly accessible;
set a second sharing state from the plurality of sharing states, the second sharing state associated with the second content item based on the second sharing configuration; and
display a content list containing a plurality of rows, a plurality of columns, and a plurality of elements, the plurality of rows including a first row corresponding to the first content item and a second row corresponding to the second content item, the plurality of columns including a sharing hint column, the plurality of elements including a first element and a second element, the first element arranged under the sharing hint column on the first row and containing a first sharing icon corresponding to the first sharing state, the second element arranged under the sharing hint column on the second row and containing a second sharing icon corresponding to the second sharing state.

12. The computer-readable storage medium of claim 11, wherein to set the first sharing state associated with the first content item based on the first sharing configuration, the computer-executable instructions further cause the computer to identify, from the plurality of sharing states, the first sharing state that matches the first sharing configuration; and
wherein to set the second sharing state associated with the second content item based on the second sharing configuration, the computer-executable instructions further cause the computer to identify, from the plurality of sharing states, the second sharing state that matches the second sharing configuration.

13. The computer-readable storage medium of claim 12, wherein to display the content list containing the plurality of rows, the plurality of columns, and the plurality of elements, the computer-executable instructions further cause the computer to:
identify, from a plurality of sharing icons, the first sharing icon that matches the first sharing state; and
identify, from the plurality of sharing icons, the second sharing icon that matches the second sharing state.

14. The computer-readable storage medium of claim 13, wherein the plurality of sharing icons comprises a lock icon corresponding to the locked state, a person icon corresponding to the small semi-locked state, a people icon corresponding to the large semi-locked state, a building icon corresponding to the enterprise state, and a globe icon corresponding to the global state.

15. The computer-readable storage medium of claim 14, wherein a quantity of the first set of users is less than the threshold; wherein the first sharing icon comprises the person icon; wherein the first sharing icon comprises a numeric indicator arranged adjacent to or partially overlapping the first sharing icon, the numeric indicator specifying the quantity of the first set of users; and wherein the first sharing icon is adapted to glow when one of the first set of users is currently editing the first content item.

16. The computer-readable storage medium of claim 15, wherein the computer-executable instructions further cause the computer to:
receive a first user interaction indicating that a cursor is hovering over the first sharing icon; and
when the first user interaction indicating that the cursor is hovering over the first sharing icon is received, launch a tooltip positioned over the content list, the tooltip containing a list of names of the first set of users.

17. The computer-readable storage medium of claim 16, wherein the computer-executable instructions further cause the computer to:
receive a second user interaction indicating that the first sharing icon has been selected; and
when the second user interaction indicating that the first sharing icon has been selected is received, launch a window positioned over the content list, the window containing an interface enabling the owner to contact the first set of users and to modify the first set of users.

18. A computer system, comprising:
a processor;
a memory communicatively coupled to the processor; and
a program module which executes in the processor from the memory and which, when executed by the processor, causes the computer system to:
retrieve a first sharing configuration associated with a first content item in a content library, the first sharing configuration specifying a first set of users who are authorized by an owner to access the first content item,
retrieve a second sharing configuration associated with a second content item in the content library, the second sharing configuration specifying a second set of users who are authorized by the owner to access the second content item,
set a first sharing state associated with the first content item based on the first sharing configuration,
set a second sharing state associated with the second content item based on the second sharing configuration, and
display a content list containing a plurality of rows, a plurality of columns, and a plurality of elements, the plurality of rows including a first row corresponding to the first content item and a second row corresponding to the second content item, the plurality of columns including a sharing hint column, the plurality of elements including a first element and a second element, the first element arranged under the sharing hint column on the first row and containing a first sharing icon corresponding to the first sharing state, the first sharing icon comprising a numeric indicator arranged adjacent to or partially overlapping the first sharing icon, the numeric indicator specifying a quantity of the first set of users, the second element arranged under the sharing hint column on the second row and containing a second sharing icon corresponding to the second sharing state.

19. The computer-readable storage medium of claim 11, wherein the first sharing configuration specifies a first set of users who are authorized by an owner to access the first content item, and wherein the second sharing configuration specifies a second set of users who are authorized by the owner to access the second content item.

20. The computer-readable storage medium of claim 11, wherein the plurality of columns further comprise a type column, a name column, a modified column, and a modified by column,
wherein the plurality of elements further comprise a first type element, a second type element, a first name element, a second name element, a first modified element, a second modified element, a first modified by element, and a second modified by element,
wherein the first type element is arranged under the type column on the first row and contains a first type icon specifying a first type of the first content item and the second type element is arranged under the type column on the second row and contains a second type icon specifying a second type of the second content item,
wherein the first name element is arranged under the name column on the first row and contains a first name of the first content item and the second name element is arranged under the name column on the second row and contains a second name of the second content item,
wherein the first modified element is arranged under the modified column on the first row and contains a first date and time when the first content item was last modified and the second modified element is arranged under the modified column on the second row and contains a second date and time when the second content item was last modified, and
wherein the first modified by element is arranged under the modified by column on the first row and contains a first identifier of who last modified the first content item and the second modified by element is arranged under the modified by column on the second row and contains a second identifier of who last modified the second content item.

\* \* \* \* \*